US012631829B2

(12) United States Patent
Hirose

(10) Patent No.: US 12,631,829 B2
(45) Date of Patent: May 19, 2026

(54) OPTICAL CONNECTOR AND METHOD FOR MANUFACTURING OPTICAL CONNECTOR

(71) Applicant: Fujikura Ltd., Tokyo (JP)

(72) Inventor: Masayuki Hirose, Sakura (JP)

(73) Assignee: Fujikura Ltd., Tokyo (JP)

( * ) Notice: Subject to any disclaimer, the term of this patent is extended or adjusted under 35 U.S.C. 154(b) by 469 days.

(21) Appl. No.: 18/017,750

(22) PCT Filed: Jun. 4, 2021

(86) PCT No.: PCT/JP2021/021362
§ 371 (c)(1),
(2) Date: Jan. 24, 2023

(87) PCT Pub. No.: WO2022/079943
PCT Pub. Date: Apr. 21, 2022

(65) Prior Publication Data
US 2023/0296852 A1 Sep. 21, 2023

(30) Foreign Application Priority Data

Oct. 15, 2020 (JP) ................................. 2020-173708

(51) Int. Cl.
*G02B 6/38* (2006.01)
(52) U.S. Cl.
CPC ......... *G02B 6/3821* (2013.01); *G02B 6/3849* (2013.01); *G02B 6/3858* (2013.01); *G02B 6/3893* (2013.01)
(58) Field of Classification Search
None
See application file for complete search history.

(56) References Cited

U.S. PATENT DOCUMENTS 10,371,903 B1 8/2019 Nguyen et al.
2006/0285814 A1 12/2006 Brown et al.
(Continued)

FOREIGN PATENT DOCUMENTS

CN 101299086 A 11/2008
CN 110824622 A 2/2020
(Continued)

OTHER PUBLICATIONS

English translation of the International Search Report issued in corresponding International Application No. PCT/JP2021/021362, dated Aug. 24, 2021 (3 pages).

*Primary Examiner* — Jerry Rahll
(74) *Attorney, Agent, or Firm* — Osha Bergman Watanabe & Burton LLP

(57) ABSTRACT

An optical connector includes: a ferrule that includes a connection end surface, and a fiber hole into which an optical fiber is configured to be inserted up to the connection end surface; a spring that is disposed on a rear side of the ferrule that is opposite to a front side that is a side on which the connection end surface is disposed in a longitudinal direction of the fiber hole; a spring push that sandwiches the spring with the ferrule and through which the optical fiber is inserted in the longitudinal direction; and a housing that accommodates the ferrule and the spring and that is engaged with the spring push such that the ferrule is biased to the front side by the spring. The optical fiber is configured to be inserted into and removed from the spring push.

8 Claims, 12 Drawing Sheets

(56)     References Cited

U.S. PATENT DOCUMENTS

| | | | |
|---|---|---|---|
| 2012/0213484 A1* | 8/2012 | Childers .............. | G02B 6/3885 29/428 |
| 2017/0090126 A1* | 3/2017 | Lu ........................ | G02B 6/3821 |
| 2017/0205588 A1 | 7/2017 | Lee | |
| 2020/0116936 A1 | 4/2020 | Wong et al. | |
| 2023/0296852 A1* | 9/2023 | Hirose ................. | G02B 6/3849 |

FOREIGN PATENT DOCUMENTS

| | | |
|---|---|---|
| CN | 111417882 A | 7/2020 |
| JP | 200039538 A | 2/2000 |
| JP | 2008122728 A | 5/2008 |
| JP | 2008292836 A | 12/2008 |
| JP | 2011027856 A | 2/2011 |
| JP | 5690005 B1 | 3/2015 |
| JP | 6083087 B2 | 2/2017 |
| WO | 2015017170 A1 | 2/2015 |

* cited by examiner

1A

OPTICAL CONNECTOR AND METHOD FOR MANUFACTURING OPTICAL CONNECTOR

TECHNICAL FIELD

The present invention relates to an optical connector and a method for manufacturing the optical connector.

Priority is claimed on Japanese Patent Application No. 2020-173708, filed Oct. 15, 2020, the content of which is incorporated herein by reference.

BACKGROUND

Patent Document 1 discloses a method for passing optical fiber cables through a duct (pipeline). In order to lay the optical fiber cable including a plurality of optical fibers through, the optical fiber cable is in a state where a connector (optical connector) is terminated to each of the ends of the optical fibers (distal end part).

PATENT LITERATURE

[Patent Document 1] Japanese Patent No. 6083087

In recent years, increasing the number of optical fibers laid within a duct while maintaining the same duct size (thickness) is in demand. In this case, the size of an optical connector, when seen from a longitudinal direction of the duct or the optical fibers, is larger than the size of the optical fibers. For this reason, the bulkiness of the optical connector prevents increasing the number of optical fibers that can be inserted through the duct.

SUMMARY

One or more embodiments of the present invention provide an optical connector where it is possible to insert more optical fibers through a duct, and provide a method for manufacturing the optical connector.

An optical connector according to first embodiments of the present invention includes a ferrule that includes a connection end surface and a fiber hole which is configured to insert an optical fiber to the connection end surface, a spring that is arranged on a rear side of the ferrule, when the connection end surface side in a longitudinal direction of the fiber hole is defined as a front side and the opposite side is defined as the rear side, a spring push that sandwiches the spring between the spring push and the ferrule, and through which the optical fiber is inserted in the longitudinal direction, and a housing that accommodates the ferrule and the spring, and that is engaged with the spring push such that the ferrule is biased to the front side by the spring. The spring push is configured to insert and remove the optical fiber.

In the optical connector above, the housing is configured so as to accommodate the ferrule within the housing. For this reason, the housing is larger than the ferrule, as seen from the longitudinal direction of the fiber hole. The spring push which engages the housing is also larger than the ferrule, as seen from the longitudinal direction. On the other hand, since the housing is configured so as to accommodate the spring within the housing, it is possible for the spring to be smaller than the size of the ferrule, as seen from the longitudinal direction of the fiber hole.

Additionally, in the above optical connector, after providing the ferrule on an end part of the optical fiber, it is possible to insert the optical fiber through the spring push. It is possible to accommodate the ferrule within the housing. In other words, out of the members that configures the optical connector, the larger sized housing and the spring push can be attached against the optical fiber and the ferrule after the ferrule is provided on the end part of the optical fiber. For this reason, in a state where the small sized ferrule and the spring among the parts that configure the optical connector are provided, and after inserting the optical fiber through the duct, it is possible to attach the larger sized housing among the members that configures the optical connector to the optical fiber and the ferrule on the end part of the optical fiber. Accordingly, in the phase where the optical fiber is inserted through the duct, since the size of the optical connector on the end part of the optical fiber may be suppressed so that the size of the optical connector on the end part of the optical fiber is small, it is possible to insert more optical fibers through the duct.

The above optical connector may include a pin clamp that is arranged between the ferrule and the spring to hold a front end part of the spring. The optical fiber may be protected by a protection member, and one end of the protection member may be engaged with the pin clamp.

In the optical connector mentioned above, the above spring push may include a first member that contacts the spring, and a second member that accommodates the first member within, as the second member supports the first member, and is engaged with the housing. The second member may be configured to insert and remove the optical fiber.

In the above optical connector, the second member may be configured to insert and remove the optical fiber from a direction orthogonal to the longitudinal direction.

In the optical connector above, the second member may have a cylindrical part through which the optical fiber is inserted. A slit which extends over an entire length of the cylindrical part in the longitudinal direction may be formed on a part of the cylindrical part in a circumferential direction of the cylindrical part. The first member may include a positioning protrusion inserted into the slit.

In the optical connector above, the second member may be constituted by two divided structures that are aligned in a direction orthogonal to the longitudinal direction.

In the optical connector above, in a direction orthogonal to the longitudinal direction, a maximum dimension of the first member may be equal to or less than a maximum dimension of the ferrule.

The optical connector above may include a cap which covers the fiber hole in the front side, and a guide pin which is provided to penetrate the ferrule in the longitudinal direction. The cap may include a fitting hole into which the front end part of the guide pin projecting to the front side from the connection end surface is fitted.

In second embodiments of the present invention according to a method for manufacturing an optical connector, the method includes a first process of arranging in order the ferrule and the spring from an end part of the optical fiber; a second process of inserting the optical fiber through the spring push after the first process; and a third process of accommodating the ferrule and the spring within the housing and engaging the spring push with the housing such that the ferrule is biased to a front side after the second process.

In the method for manufacturing the optical connector above, after carrying out a first process of providing a small sized ferrule, and a spring on the optical fiber, and before carrying out a second process of attaching a large sized spring push on the optical fiber and a third process of attaching a large sized housing on the ferrule, it is possible to insert the optical fiber through a duct. Accordingly, since a size of the optical connector on an end part of the optical fiber may be suppressed so that size of the optical connector on an end part of the optical fiber is small, in the phase of inserting the optical fiber through the duct, it is possible to insert more optical fibers through the duct.

According to one or more embodiments of the present invention, it is possible to insert more optical fibers through a duct.

DETAILED DESCRIPTION

First Embodiments

Hereinafter, first embodiments of the present invention are described with reference to FIG. 1 to FIG. 10.

Figure 1:
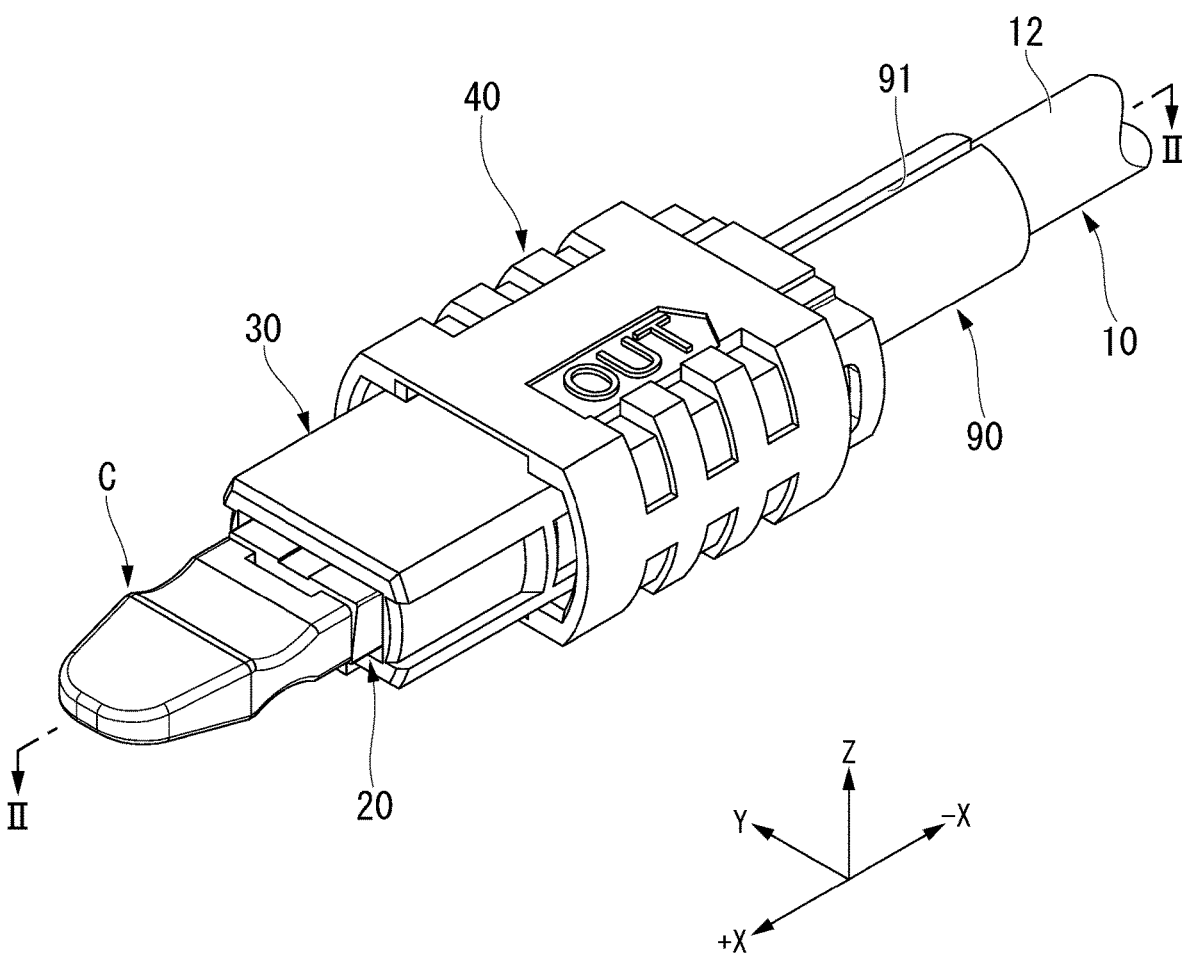
FIG. 1 is a perspective view of an optical connector according to first embodiments.
Figure 2:
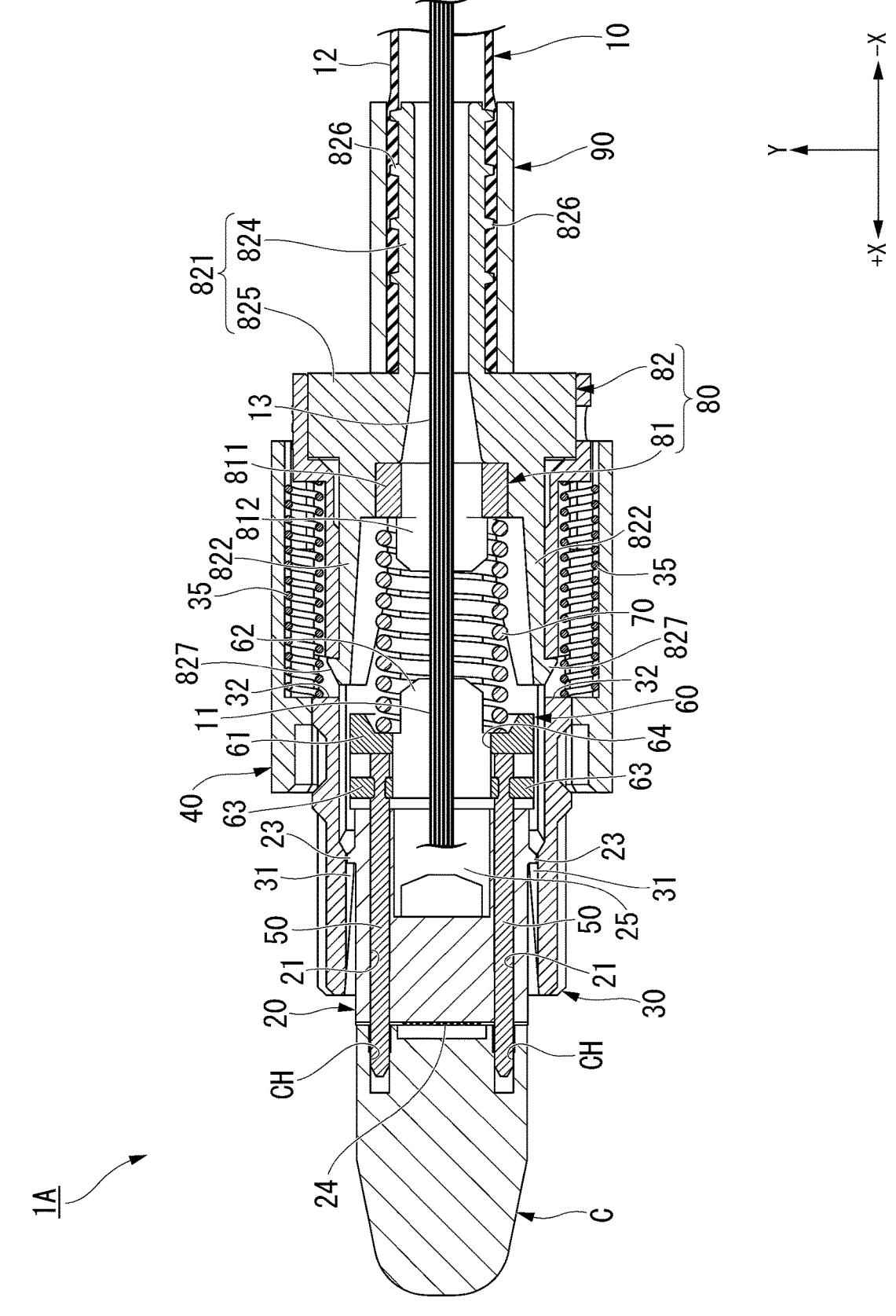
FIG. 2 is a cross-sectional arrow view II-II of FIG. 1.
Figure 3:
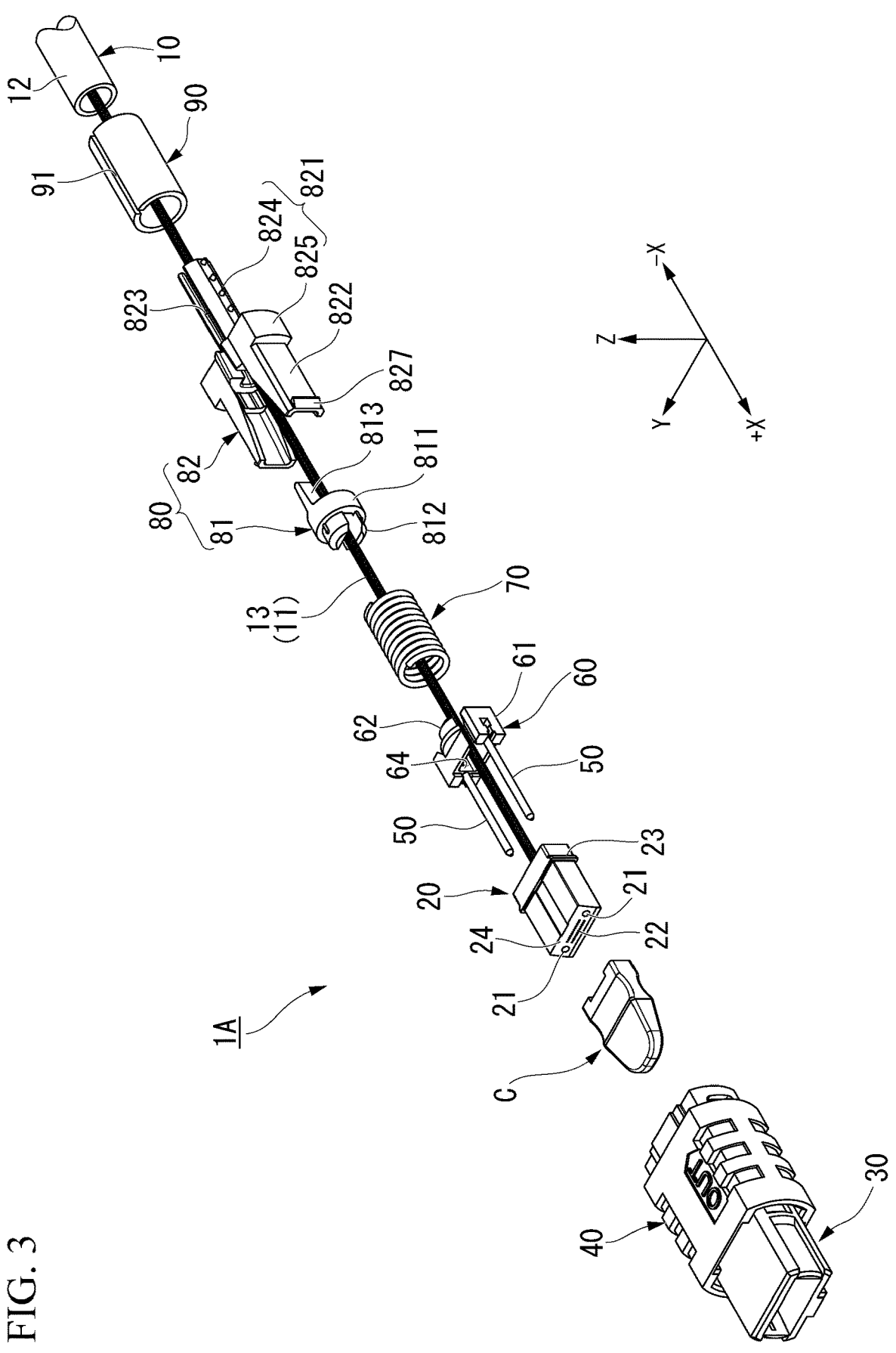
FIG. 3 is an exploded perspective view of the optical connector of FIG. 1.

As shown in FIG. 1 to FIG. 3, an optical connector 1A of first embodiments includes an optical cable 10, a ferrule 20, a housing 30, a coupling 40, a cap C, two guide pins 50, a pin clamp 60, a spring 70, a spring push 80, and a crimp ring 90. The optical connector 1A of one or more embodiments is an MPO (Multi-fiber Push On) type.

As shown in FIG. 2 and FIG. 3, the optical cable 10 includes a plurality of optical fibers 11, and an outer cover 12 that covers the plurality of the optical fibers 11. An end part in the longitudinal direction of the optical fibers 11 is drawn out from an end part of the outer cover 12 to insert the optical fibers 11 through the ferrule 20. In other words, the outer cover 12 is not provided on an outer circumference of the optical fiber 11 of the housing 30.

Two guide holes 21, a plurality of fiber holes 22, and two restricting protrusions 23 are formed in the ferrule 20. The guide holes 21 and the fiber holes 22 are open to a connection end surface 24 of the ferrule 20. A guide pin 50 is inserted through each of the guide holes 21, and end parts of the optical fibers 11 of the optical cable 10 are inserted through each of the fiber holes 22. The number of the fiber holes 22 which the ferrule 20 has may be changed accordingly, and may be 1 for example. In other words, the number of the optical fibers 11 which the optical connector 1A includes may be one or more.

The optical connector 1A includes boots 25. The boots 25 are inserted into the ferrule 20.

(Definition of Directions)

In one or more embodiments, a longitudinal direction of the optical fibers 11, the guide holes 21, and the fiber holes 22 is referred to as an axial direction X. The direction in which two of the guide holes 21 or two of the guide pins 50 are aligned is referred to as a left and right direction Y (horizontal width direction). The left and right direction Y is orthogonal to the axial direction X. A direction in which the axial direction X and the left and right direction Y are both orthogonal is referred to as an up and down direction Z (vertical width direction). The connection end surface 24 side in the axial direction X is referred to as the front side (+X side) or the distal end side, while the opposite side is referred to as the rear side (−X side), or the proximal end side.

The guide holes 21 of the ferrule 20 and the fiber holes 22, each penetrate the ferrule 20 in the axial direction X. The restricting protrusion 23 of the ferrule 20 protrudes to the outside from both ends of the ferrule 20 in the left and right direction Y.

End surfaces of the optical fibers 11 that are inserted through the fiber holes 22 are exposed from the connection end surface 24 of the ferrule 20. The connection end surface 24 may be inclined with respect to the up and down direction Z, for example, so that the connection end surface 24 faces the rear side as the connection end surface 24 heads along the up side to the down side. The connection end surface 24 including such an inclination can be formed, for example, by polishing the ferrule 20.

Figure 6:
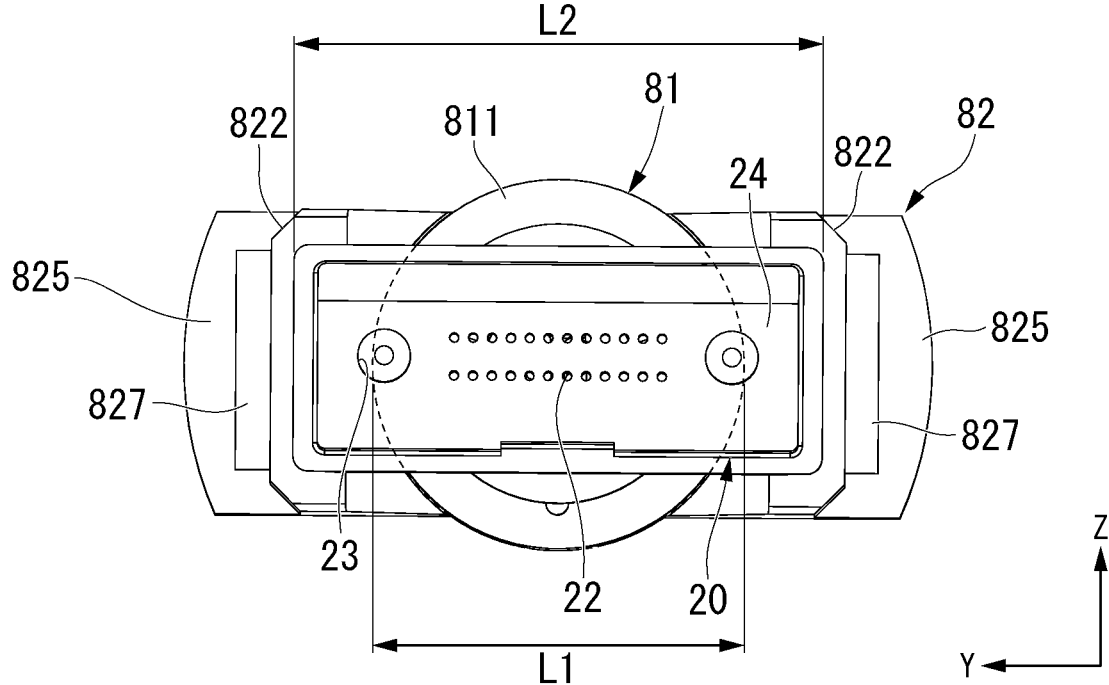
FIG. 6 is a view of a first member and a second member of a ferrule on FIG. 3 as seen from the front side.

The ferrule 20 of one or more embodiments, as shown in FIG. 6 seen from the front side, is formed into a horizontally long rectangle such that a dimension in the up and down direction Z (vertical width direction) is smaller than a dimension in the left and right direction Y (horizontal width direction).

As shown in FIG. 2 and FIG. 3, the housing 30, is formed so as to extend in the axial direction X in a cylindrical shape. The housing 30 is open towards both the front side and the rear side. The ferrule 20 is inserted through the housing 30 from the rear side. In the state where the ferrule 20 is accommodated within the housing 30, the restricting protrusion 23 of the ferrule 20 contacts a lock part 31 formed within the housing 30 from the rear side. In other words, the restricting protrusion 23 of the ferrule 20 restricts the ferrule 20 from falling out to the front side of the housing 30. The front end part which includes the connection end surface 24 of the ferrule 20 accommodated within the housing 30 protrudes to the front side from an opening of the front side of the housing 30.

As shown in FIG. 2, two engaging holes 32 are formed in the housing 30. The engaging holes 32 are formed on both end parts of the housing 30 in the left and right direction Y. On FIG. 2, each of the engaging holes 32 penetrate the housing 30 from the inside to the outside in the left and right direction Y. Furthermore, each of the engaging holes 32, for example, may be holes that have a bottom and are recessed from the inside of the housing 30 towards the outside without penetrating the housing 30.

As shown in FIG. 1 to FIG. 3, the coupling 40, is formed into a cylindrical shape that extends in the axial direction X, and envelopes the housing 30 from the outside. Although the detailed explanation is omitted, the coupling 40 is the member held by the user when pulling the optical connector 1A from a connection object (an adapter and the like) in the rear side.

As shown in FIG. 2, in the axial direction X, two second springs 35 are provided between the housing 30 and the coupling 40. The two second springs 35 are arranged on both sides of the housing 30 in the left and right direction Y. The second springs 35 biases the coupling 40 towards the front side, and biases the housing 30 towards the rear side. The second spring 35, is responsible for a recovery motion to the front side of the coupling 40 that moves in the rear side with respect to the housing 30.

As shown in FIG. 2 and FIG. 3, the pin clamp 60 is arranged in the rear side of the ferrule 20, and holds the rear end part of the guide pin 50 protruding to the rear side of the ferrule 20. The pin clamp 60 includes a clamp main body 61 and a spring holding part 62.

The clamp main body 61 includes two pin holding parts 63 which hold the rear end parts of two of the guide pins 50. Each of the guide pins 50 held by the pin holding parts 63 extends in the front side of the clamp main body 61 in the axial direction X. Each of the guide pins 50, for example, is inserted through the guide holes 21 from the rear side of the ferrule 20, and protrudes to the front side from the connection end surface 24 of the ferrule 20. By having the clamp main body 61 which holds two of the guide pins 50 contacts the ferrule 20 from the rear side, it is possible to prevent the extraction of the two of the guide pins 50 to the front side of the ferrule 20. Furthermore, the positional relation between a proximal end part (an end part of the proximal end side) of the ferrule 20 and the clamp main body 61 is fixed. When the pin holding part 63 is an elastic body, after inserting the guide pin 50 through the distal end side (the connection end surface 24) of the ferrule 20, it is possible to for the guide pins 50 to be fitted and inserted, and fixed into the clamp main body 61 (the pin holding part 63).

The spring holding part 62 protrudes to the rear side from the clamp main body 61. The spring holding part 62 holds a front end part of the cylindrical shaped spring 70 arranged in the rear side of the pin clamp 60. Specifically, the spring holding part 62 is fitted and inserted onto the inside of the front end part of the spring 70. Accordingly, the front end part of the spring 70 is held by the pin clamp 60.

In the pin clamp 60, an inserting through hole 64 is formed as a through hole in the axial direction X. The inserting through hole 64 is formed on both of the clamp main body 61 and the spring holding part 62 aligned in the axial direction X. An extending part 13 of the optical fiber 11 extending in the rear side from the ferrule 20 is inserted into the inserting through hole 64.

The cap C covers the fiber holes 22 open on the connection end surface 24 of the ferrule 20 from the front side. Therefore, it is possible to prevent dirt from adhering to or any scratches from forming on the end surface of the optical fiber 11 that is exposed from the connection end surface 24. The cap C includes two fitting holes CH. The front end parts of the guide pins 50 protruding in the front side from the connection end surface 24 of the ferrule 20 are fitted and inserted into the two fitting holes CH. Accordingly, it is possible for the cap C to hold the connection end surface 24 of the ferrule 20.

As shown in FIG. 1 and FIG. 2, the cap C, as seen in a state where the cap C is attached to the ferrule 20 from the front side, is a size that does not bulge to the outside of the ferrule 20, in other words, when seen from the axial direction X (the front surface of the optical connector 1A), is formed so as to fit to the inside rather than the outer circumference of the connection end surface 24. In one or more embodiments, the shape and size of the cap C as seen from the front side, is the same shape and size of the ferrule 20 as seen from the front side. The cap C of one or more embodiments forms a tapered shape in which the cross sectional surface orthogonal to the axial direction X becomes smaller as the cross sectional surface separates from the ferrule 20 in the front side.

As shown in FIG. 2 and FIG. 3, the spring 70 is arranged in the rear side of the ferrule 20 and the pin clamp 60, and is capable of deforming elastically in the axial direction X. Specifically, the spring 70 is a cylindrical shaped coil spring which elastically expands and contracts in the axial direction X. In the inside of the spring 70, the extending part 13 of the optical fiber 11 is inserted through the pin clamp 60 from the rear side. The spring 70, along with the ferrule 20 and the pin clamp 60 is accommodated within the housing 30.

Figure 4:
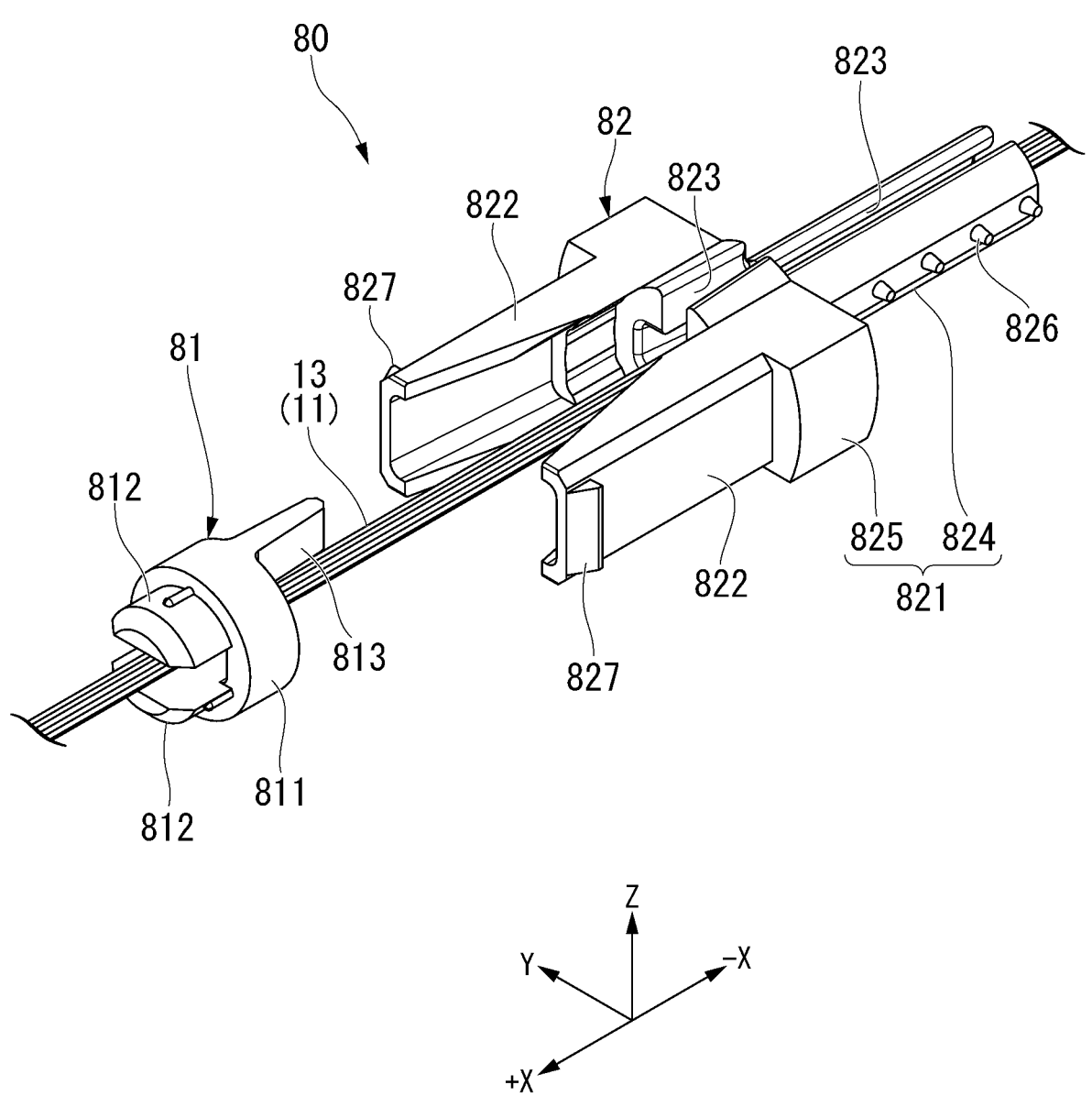
FIG. 4 is a perspective view showing an enlarged view of a first member and a second member of FIG. 3.

The spring push 80 sandwiches the spring 70 in the axial direction X between the spring push 80 and the pin clamp 60. As shown in FIG. 2 to FIG. 4, the spring push 80 includes a first member 81 and a second member 82, and is capable of inserting the optical fiber 11.

The first member 81 is arranged in the rear side of the spring 70, and is provided so that the first member 81 connects to the rear end part of the spring 70. Although not shown on the Figs, the first member 81, in a state where the first member 81 is arranged on the rear end part of the spring 70, along with the ferrule 20, the pin clamp 60, and the spring 70 is capable of being accommodated within the housing 30. The first member 81 includes a main body part 811, a spring holding part 812, and a positioning protrusion 813.

The main body part 811 is formed to be a cylindrical shape to correspond with the spring 70. In the rear side direction of the spring 70, the extending part 13 of the optical fiber 11 is inserted through on the inside of the main body part 811. The size of the main body 811 as seen from the axial direction X corresponds to the size of the outer radius of the cylindrical shaped spring 70. Accordingly, since the first member 81 is arranged in the rear side of the spring 70, it is possible for the main body part 811 to cover the rear end of the spring 70.

The spring holding part 812 protrudes from the main body part 811 towards the front side (distal end side). The spring holding part 812 holds the rear end part of the spring 70. Specifically, by fitting and inserting the spring holding part 812 into the inside of the rear end part of the spring 70 which is cylindrically shaped, the rear end part of the spring 70 is held by the spring holding part 812. Accordingly, the first member 81 is fixed to the rear end part of the spring 70. The spring holding part 812 is formed so as not to cover the space that is formed to be a cylindrical shape within the main body 811 from the front side. Since the spring holding part 812, as shown in FIG. 3 and FIG. 4, is formed so that the spring holding part 812 is split in the up and down direction Z. The spring holding part 812 may be formed so that the spring holding part 812 is a cylindrical shape, similar to the main body part 811.

Figure 5:
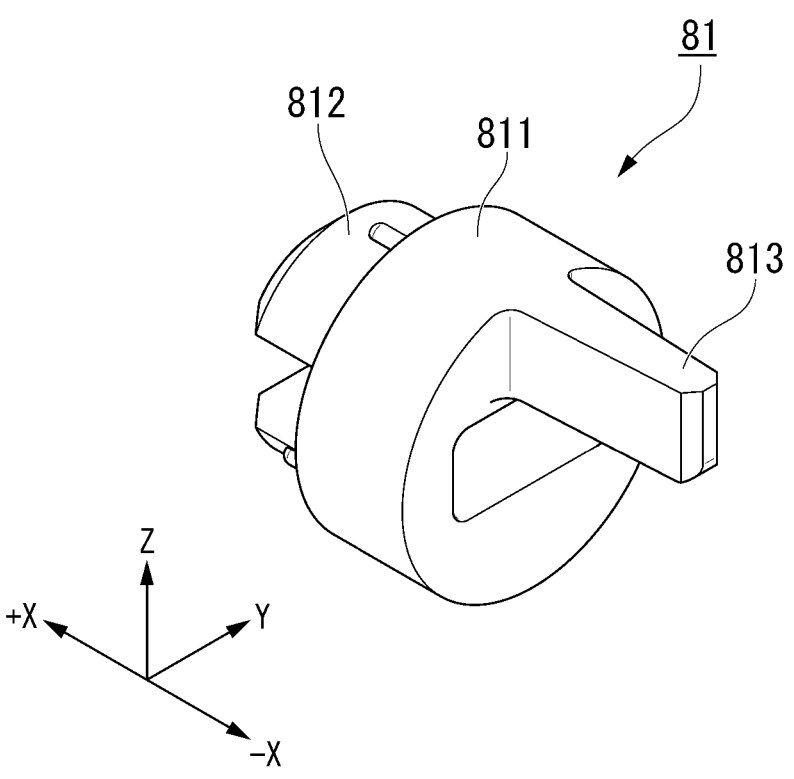
FIG. 5 is a perspective view of a first member of FIG. 3 and FIG. 4 as seen from the rear side.

As shown in FIG. 3 to FIG. 5, the positioning protrusion 813 protrudes in the rear side from the main body part 811. The positioning protrusion 813 is formed on a portion of the main body part 811 in the circumferential direction, so that the positioning protrusion 813 does not cover the space within the main body part 811 from the rear side. Although in FIG. 5, the positioning protrusion 813 is formed on the top end of the up and down direction Z of the main body part 811, the position of the positioning protrusion 813 is not limited thereto. In the axial direction X the positioning protrusion 813 is inserted into a later mentioned slit 823 of the second member 82 (refer to FIG. 9).

As shown in FIG. 6, in a direction which is orthogonal to the axial direction X (longitudinal direction), the largest dimension L1 of the first member 81 is less than or equal to the largest dimension L2 of the ferrule 20. In one or more embodiments, the first member 81 is formed so that the first member 81 is a circular shape as seen from the axial direction X. For this reason, the largest dimension of the first member 81 as seen from the axial direction X is a diameter dimension of the circular shape. On the other hand, the ferrule 20 is formed to be a horizontally long rectangle shape having the longer end in the left and right direction Y, as seen from the axial direction X. For this reason, the largest dimension of the ferrule 20 is a dimension of the left and right direction Y (horizontal width direction) as seen from the axial direction X.

Also, the diameter dimension of the first member 81 (dimension of the left and right direction Y) as shown in FIG. 6 seen from the front side, is less than or equal to the dimension in the left and right direction Y (long end dimension) of the ferrule 20. For this reason, the first member 81 does not bulge to the outside from both ends of the left and right direction Y of the ferrule 20. On the other hand, since the diameter dimension of the first member 81 (dimension of the up and down direction Z) is larger than the dimension of the ferrule 20 in the up and down direction Z (short end dimension), the first member 81 bulges to the outside from both ends of the up and down direction Z of the ferrule 20. However, the length that the first member 81 bulges to the outside from both ends of the ferrule 20 in the up and down direction Z is smaller than the dimension of the ferrule 20 in the up and down direction Z.

As shown in FIG. 2 to FIG. 4, the second member 82 supports the first member 81 from the rear side (proximal end side). The second member 82 is engaged with the housing 30. The second member 82 includes a cylindrical part 821 and two engaging pieces 822.

The cylindrical part 821 is formed as a cylindrical shape extending in the axial direction X, and inserts the extending part 13 of the optical fiber 11 in the rear side of the first member 81. The cylindrical part 821, in a state where the ferrule 20 is provided on an end of the optical fiber 11, is configured so as to be capable of inserting and removing the extending part 13 of the optical fiber 11. Specifically, the slit 823 is formed on the cylindrical part 821. The slit 823, on a part of the circumferential direction of the cylindrical part 821, extends over the entire length of the cylindrical part 821 in the axial direction X.

In other words, the slit 823 is open on an end in the axial direction X of the cylindrical part 821. Accordingly, since the extending part 13 of the optical fiber 11 is passed through the slit 823 of the cylindrical part 821, it is possible to insert and remove the extending part 13 from a direction orthogonal to the axial direction X with respect to the cylindrical part 821. The slit 823 of one or more embodiments is formed on the top end of the cylindrical part 821 in the up and down direction Z.

In one or more embodiments, the inner space within the cylindrical part 821 through which the extending part 13 of the optical fiber 11 is inserted through is smaller than the ferrule 20, the pin clamp 60, the spring 70 and the first member 81 as seen from the axial direction X. For this reason, it is not possible to insert the ferrule 20, the pin clamp 60, the spring 70 and the first member 81 through the inner space within the cylindrical part 821.

Since the front end of the above cylindrical part 821 contacts the rear end of the main body part 811 of the first member 81, the cylindrical part 821 supports the first member 81 from the rear side. In a state where the cylindrical part 821 supports the first member 81 from the rear side, the positioning protrusion 813 of the first member 81 is inserted into the slit 823 of the cylindrical part 821 (FIG. 9) in the axial direction X. Accordingly, it is possible to suppress or prevent the relative displacement of the position of the cylindrical first member 81 and the second member 82 in an orthogonal direction to the axial direction X. Also, it is possible to suppress or prevent the displacement of the position of the cylindrical shaped first member 81 and the second member 82 of the cylinder in a circumferential direction. In this manner, by inserting the positioning protrusion 813 into a part of the slit 823, since the part of the slit 823 suppresses the rotation of the first member 81, the slit 823 functions as a suppressing part.

In one or more embodiments, the cylindrical part 821 includes a cylindrical main body 824 which is a cylindrical shape extending in the axial direction X, and a bulge part 825 which bulges out to both sides in the left and right direction Y in a front end part of the cylindrical main body 824. The cylindrical main body 824 is formed to be a cylindrical shape which extends in the axial direction X. The cylindrical main body 824 is inserted into the inside of the outer cover 12 of the optical cable 10. A plurality of protrusions 826 are formed on an outer circumferential surface of the cylindrical main body 824. The plurality of the protrusions 826 catch onto the inner circumference of the outer cover 12, in a state where the cylindrical main body 824 is inserted into the outer cover 12. Accordingly, in the state where the cylindrical main body 824 is inserted into the outer cover 12, it is possible for the cylindrical main body 824 to suppress the outer cover 12 from being pulled out to the outside.

Each of the two engaging pieces 822 extend to the front side from the cylindrical part 821. Specifically, the two engaging pieces 822 extend to the front side from both end parts in the left and right direction Y of the bulge part 825 out of the cylindrical part 821. Engaging protrusions 827 are formed on the front end of each of the engaging pieces 822. Each of the engaging protrusions 827 protrude to the outside of the second member 82 in the left and right direction Y from the engaging pieces 822. As shown in FIG. 6, the two engaging pieces 822 are positioned to bulge to the outside from both ends of the left and right direction Y of the ferrule 20 as seen from the axial direction X.

As shown in FIG. 2, each of the engaging protrusions 827 is engaged with the engaging holes 32 of the housing 30. Specifically, the cylindrical part 821 of the second member 82 in the axial direction X sandwiches the pin clamp 60, the spring 70, and the first member 81 between the cylindrical part 821 and the ferrule 20. Moreover, in a state where the engaging pieces 822 of the second member 82 are inserted into the inside of the housing 30 from the rear side, the engaging protrusions 827 of the second member 82 are engaged with the engaging holes 32 of the housing 30. In this state, the spring 70 elastically compresses (elastic deformation), and the ferrule 20 becomes biased to the front side by the elastic force of the spring 70.

As shown in FIG. 2 and FIG. 3, the crimp ring 90 is formed to be a cylindrical shape. The crimp ring 90 crimps the outer cover 12 of the optical cable 10 and the cylindrical part 821 (cylindrical main body 824) of the second member 82 inserted through the outer cover 12 from the outside, and fixes the outer cover 12 and the cylindrical main body 824. Similar to the second member 82, a slit 91 which extends over the entire length of the crimp ring 90 in the axial direction X is formed on a part of the circumferential direction of the crimp ring 90.

Next, an example of producing the optical connector 1A of one or more embodiments is explained, mainly referring to FIG. 7 to FIG. 10.

When producing the optical connector 1A, a first process is carried out. In the first process, as shown in FIG. 3, starting from both end parts of the optical fiber 11, the ferrule 20, the pin clamp 60 holding the two guide pins 50 (refer to FIG. 3), the spring 70 and the first member 81 are arranged.

Figure 7:
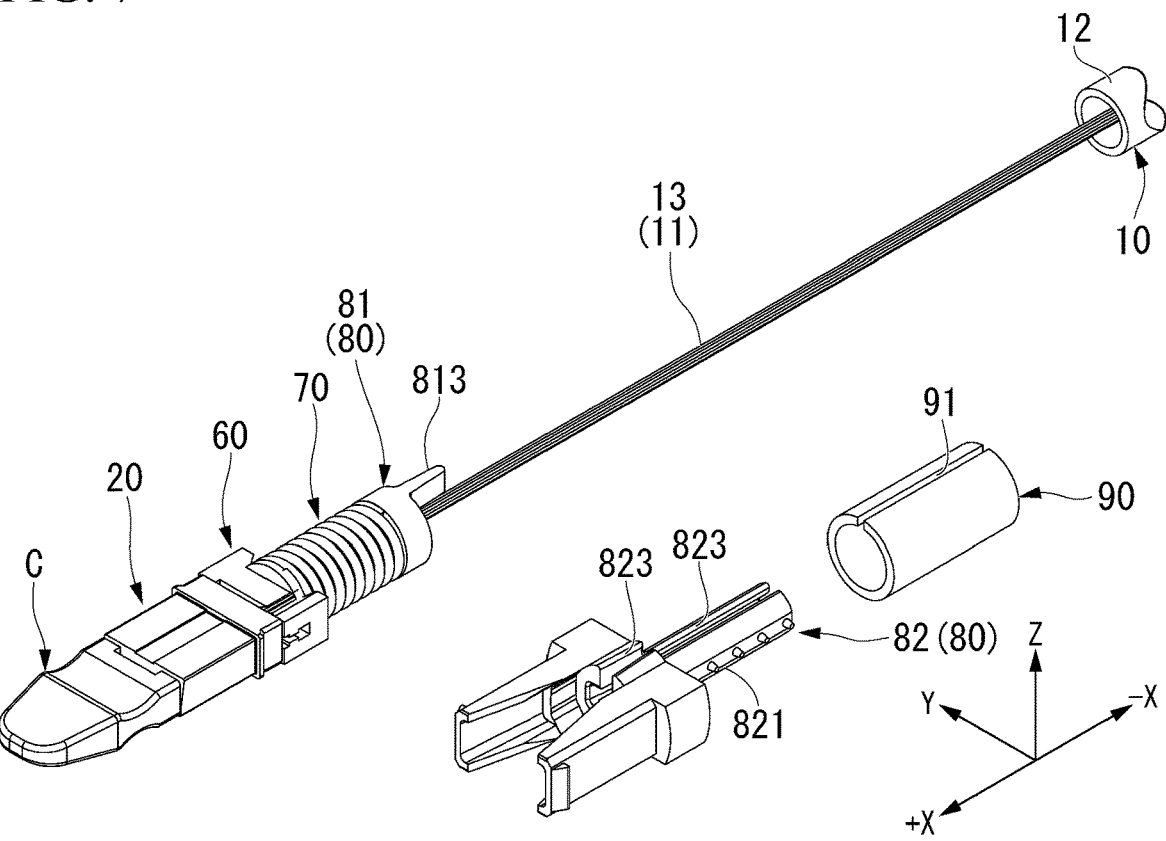
FIG. 7 is a perspective view showing a method for manufacturing an optical connector of FIG. 1 and FIG. 2.

Specifically, in the first process, after first inserting the end part of the optical fiber 11 pulled out from the outer cover 12 of the optical cable 10 through the first member 81, the spring 70 and the pin clamp 60, the end part of the optical fiber 11 pulled out from the outer cover 12 of the optical cable 10 is inserted through the fiber hole 22 of the ferrule 20 (refer to FIG. 3). Then, the pin clamp 60 is connected to the rear side of the ferrule 20, the two guide pins 50 held by the pin clamp 60 are each inserted into the guide holes 21 (refer to FIG. 3) from the rear side of the ferrule 20, and the front end parts of each of the guide pins 50 protrude from the connection end surface 24 of the ferrule 20 (refer to FIG. 3). Both end parts of the spring 70 are held by the pin clamp 60 and the spring holding part 812 of the first member 81. Moreover, by fitting and inserting each of the front end parts of the guide pins 50 into the fitting holes CH of the cap C (refer to FIG. 2), the fiber holes 22 that open on the connection end surface 24 of the ferrule 20 are covered by the cap C. Accordingly, the first process is completed. FIG. 7 shows the state where the above first process is completed.

Since the first process described above includes many manufacturing steps that require high accuracy, such as the positioning of the optical fiber 11 with respect to the ferrule 20 (especially the connection end surface 24) and the like, the first process may be carried out in a factory.

Figure 8:
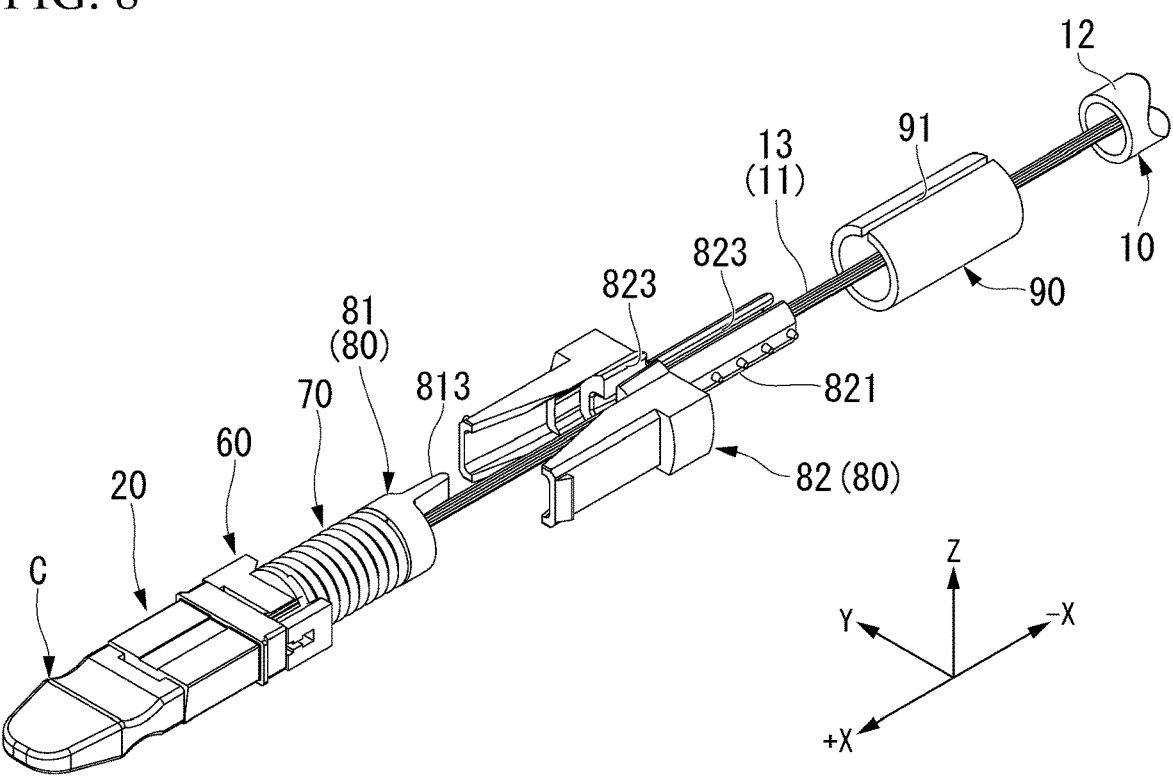
FIG. 8 is an explanatory diagram to continue the process explanation in FIG. 7.

After the first process, a second process is carried out. In the second process, as shown in FIG. 7 and FIG. 8, the extending part 13 of the optical fiber 11 extending from the rear side of the ferrule 20 is inserted through the cylindrical part 821 of the second member 82 in the rear side of the first member 81. In one or more embodiments, by passing the extending part 13 of the optical fiber 11 through the slit 823 of the cylindrical part 821, the extending part 13 is inserted through the inside of the cylindrical part 821.

Figure 9:
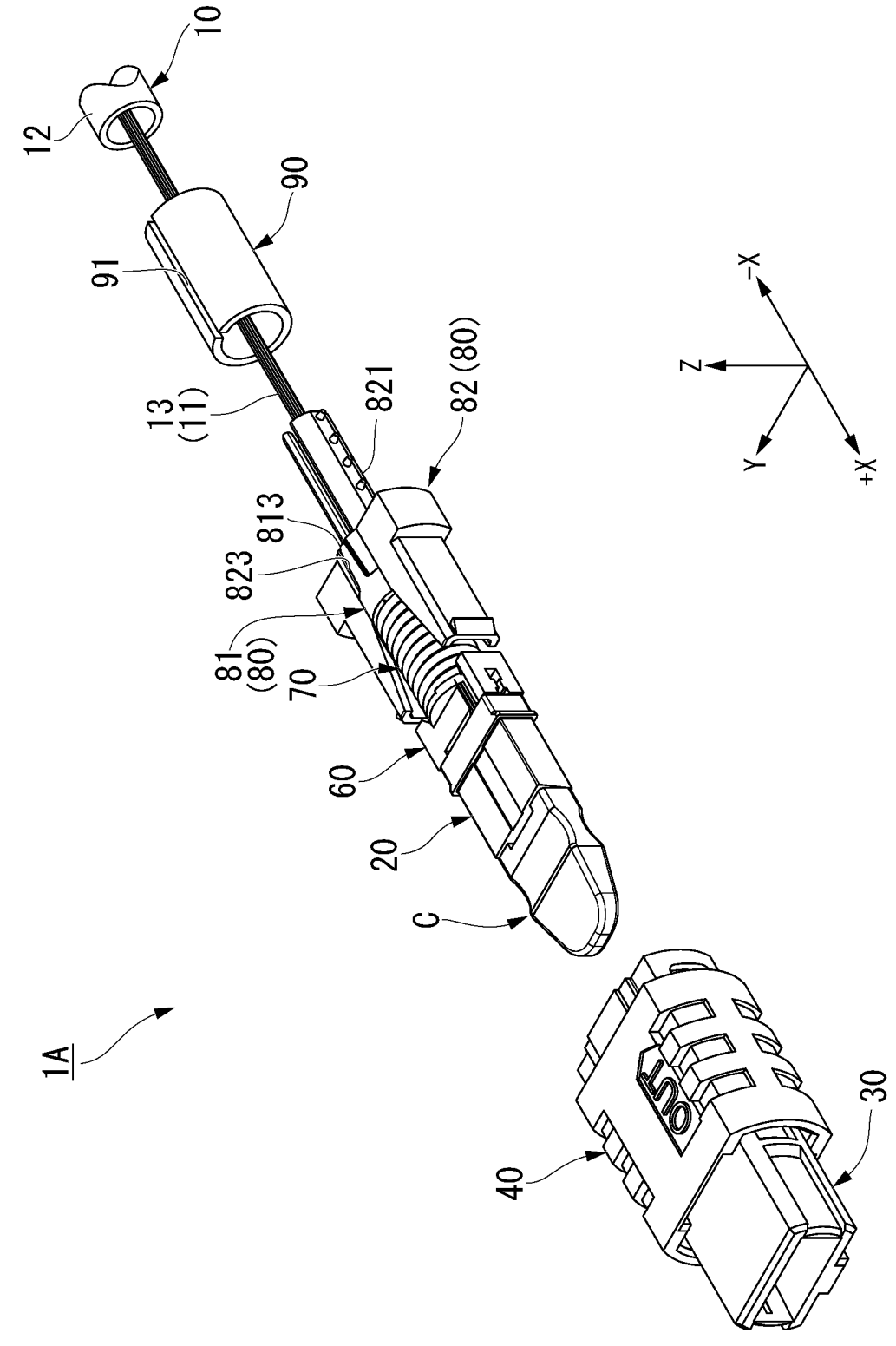
FIG. 9 is an explanatory diagram to continue the process explanation in FIG. 8.

After this, as shown in FIG. 8 and FIG. 9, the second member 82 is moved to the front side so that the first member 81 is supported by the second member 82 from the rear side. By inserting the positioning protrusion 813 of the first member 81 into the slit 823 of the second member 82, the relative position of the first member 81 and the second member 82 is determined.

In the second process, as shown in FIG. 7 to FIG. 9, the extending part 13 of the optical fiber 11 is inserted through the crimp ring 90 in the rear side of the second member 82. Specifically, similar to the second member 82, by inserting the extending part 13 of the optical fiber 11 through the slit 91 of the crimp ring 90, it is possible to insert the extending part 13 through the inside of the crimp ring 90.

Figure 10:
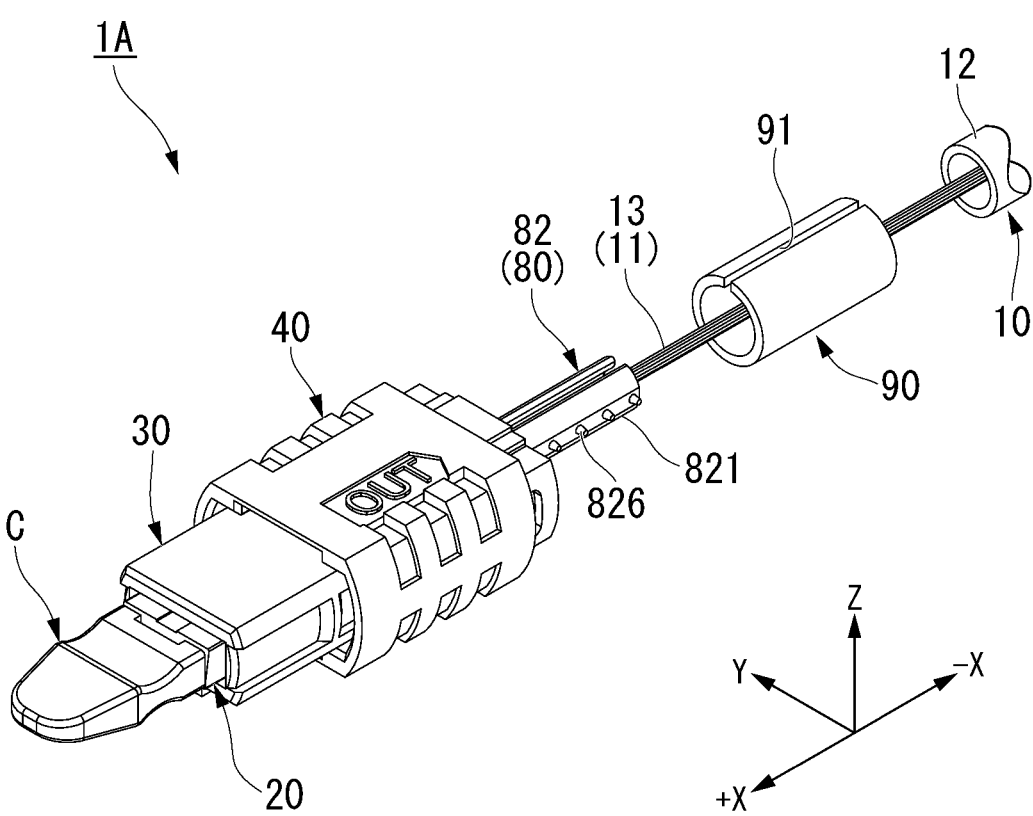
FIG. 10 is an explanatory diagram to continue the process explanation in FIG. 9.

After the second process, a third process is carried out. In the third process, as shown in FIG. 9 and FIG. 10, the second member 82 is engaged with the housing 30 along with accommodating the ferrule 20 from the rear side to the inside of the housing 30, the pin clamp 60, the spring 70 and the first member 81. Accordingly, the spring 70 deforms elastically, and the ferrule 20 is biased to the front side due to the elastic force of the spring 70.

Since both the second process and the third process above do not include manufacturing steps that require high accuracy, the second process and the third process may be carried out in a factory where the optical cable 10 (optical fiber 11) is laid into a duct for example.

Lastly, by carrying out the fixing process which includes inserting the cylindrical part 821 of the second member 82 into the outer cover 12 of the optical cable 10, then crimping and fixing the cylindrical part 821 and the outer cover 12 from the outside, the manufacturing the optical connector 1A is complete.

Furthermore, in the method for manufacturing the above mentioned optical connector 1A, the fixing process may be carried out, for example, between the second process and the third process.

As explained above, in the optical connector 1A of the first embodiments, the housing 30 is configured so as to accommodate the ferrule 20 within the housing 30. For this reason, the housing 30 is larger than the ferrule 20 as seen from a longitudinal direction of the fiber holes 22. The spring push 80 engaged with respect to the housing 30 is larger than the ferrule 20 when seen from a longitudinal direction. On the other hand, since the housing 30 is configured to accommodate the spring 70 within the housing 30, the size of the spring 70, as seen from the longitudinal direction of the fiber holes 22, can be smaller than the size of the ferrule 20. In an optical connector such as the optical connector 1A, after providing the ferrule 20 on the end part of the optical fiber 11, it is possible to insert the optical fiber 11 through a large sized spring push 80. As a result, it is then possible to pass more optical fibers 11 through the duct.

The spring push 80 includes the first member 81 and the second member 82. The first member 81 contacts the spring 70. The second member 82 accommodates and supports the first member 81 inside thereof, and is engaged with the housing 30. The second member 82 is configured such that the optical fiber 11 is capable of being inserted and removed. According to this configuration, the housing 30 and the second member 82 engaged to the housing 30 are larger than the ferrule 20 as seen from the axial direction X. For example, as shown in FIG. 6, as seen from the axial direction X, the dimension of the second member 82 in the left and right direction Y is larger than the dimension of the ferrule 20 in the left and right direction Y. On the other hand, the spring 70 and the pin clamp 60 are accommodated within the housing 30. Moreover, by configuring the first member 81 so that the first member 81 does not have an engaging function with the housing 30, the size of the bulging of the spring 70 to the outside of the ferrule 20 as seen from the axial direction X, the pin clamp 60, and the first member 81 may be configured to be smaller. As a result, it is possible to pass more optical fibers 11 through the duct.

Also, in the optical connector 1A of the first embodiments and the method for manufacturing the optical connector 1A, along with providing a small sized ferrule 20 on an end part of the optical fiber 11, after a first process of providing the small sized pin clamp 60 on the rear side of the ferrule 20 and the spring 70, it is possible to carry out a second process of inserting the extending part 13 of the optical fiber 11 through a large sized spring push 80. After the first process, it is possible to carry out a third process of accommodating the ferrule 20, the pin clamp 60 and the spring 70 in the large sized housing 30. In other words, after providing a small sized ferrule 20 on an end part of the optical fiber 11, and providing a small sized pin clamp 60 and a spring 70 on the rear side of the ferrule 20, it is possible to attach the large sized spring push 80 and the housing 30 against the optical fiber 11 and the ferrule 20.

Accordingly, after the first process of providing the small size ferrule 20 on the end part of the optical fiber 11, the pin clamp 60, and the spring 70, and before carrying out the second process and the third process of providing the large size spring push 80 and the housing 30, it is possible to pass the optical fiber 11 (optical cable 10) through the duct. In other words, in the phase of passing the optical fiber 11 (optical cable 10) through the duct, it is possible to suppress the size of the optical connector 1A on the end part of the optical fiber 11 so that the size of the optical connector 1A on the end part of the optical fiber 11 is smaller. As such, it is possible to pass more optical fibers 11 (optical cables 10) through the duct.

According to the first embodiments, the cylindrical part 821 of the spring push 80 is configured such that the extending part 13 of the optical fiber 11 is capable of being inserted and removed from a direction orthogonal to the axial direction X. For this reason, without passing the ferrule 20 provided on the end part of the optical fiber 11, the pin clamp 60, and the spring 70 through the inside of the cylindrical part 821 of the spring push 80, it is possible to insert the extending part 13 of the optical fiber 11 through the cylindrical part 821 of the spring push 80. Accordingly, even if the size of the inner space of the cylindrical part 821 of the spring push 80 that inserts the extending part 13 of the optical fiber 11 is smaller than the ferrule 20, the pin clamp 60 and the spring 70 as seen from the axial direction X, it is still possible to easily insert the extending part 13 of the optical fiber 11 through the cylindrical part 821 of the spring push 80.

According to the first embodiments, the slit 823 that extends the overall length of the cylindrical part 821 of the spring push 80 in the axial direction X is formed on a part in the circumferential direction of the cylindrical part 821 of the spring push 80. Accordingly, by passing the extending part 13 of the optical fiber 11 through the slit 823 of the cylindrical part 821 of the spring push 80, it is possible to insert the extending part 13 of the optical fiber 11 through the cylindrical part 821 of the spring push 80. As such, without passing the ferrule 20, the pin clamp 60, and the spring 70 through the inside of the cylindrical part 821 of the spring push 80, it is possible to assuredly insert the extending part 13 of the optical fiber 11 through against the cylindrical part 821 of the spring push 80.

According to the first embodiments, the first member 81 of the spring push 80 includes the positioning protrusion 813 inserted into the slit 823 of the cylindrical part 821. For this reason, by inserting the positioning protrusion 813 of the first member 81 through the slit 823 of the cylindrical part 821 of the second member 82, it is possible to determine the relative position of the first member 81 and the second member 82.

According to the first embodiments, in a direction orthogonal to the axial direction X (longitudinal direction), the largest dimension L1 of the first member 81 of the spring push 80 is less than or equal to the largest dimension L2 of the ferrule 20. For this reason, it is possible to make the size of the first member 81 bulging to the outside of the ferrule 20 as seen from the axial direction X especially small. Accordingly, since the size of the optical connector 1A on the end part of the optical fiber 11 may be suppressed so that the size of the optical connector 1A on the end part of the optical fiber 11 is small, in the phase of passing the optical fiber 11 through the duct, it possible to pass more optical fibers 11 through the duct.

According to the first embodiments, the first member 81 of the spring push 80 covers the rear end part of the spring 70. Accordingly, when passing the spring 70 in the rear side of the ferrule 20 and the first member 81 in a state where the optical fiber 11 is attached through the duct, it is possible to prevent scratching of the extending part 13 of the optical fiber 11 extending from the rear side of the ferrule 20 by the rear end part of the spring 70. In other words, it is possible to protect the optical fiber 11 when passing the optical fiber 11 through the duct accordingly.

According to the first embodiments, the spring holding part 812 of the first member 81 fits into the rear end part of the spring 70. Thereby, the first member 81 of the spring push 80 is fixed to the spring 70. Accordingly, in a state before attaching the housing 30 and the second member 82, especially when passing the optical fiber 11 through the duct, it is possible to suppress or prevent the first member 81 from unexpectedly coming off of the rear end part of the spring 70.

According to the first embodiments, the spring holding part 812 of the first member 81 is configured to be fitted and inserted into the inside of the rear end part of the spring 70. For this reason, while preventing the bulging of the first member 81 to the outside of the spring 70 as seen from the axial direction X, it is possible to fix the first member 81 to the rear end part of the spring 70.

According to the first embodiments, by fitting and inserting the front end part of the guide pins 50 into the fitting holes CH of the cap C, it is possible to protect the cap C in a state where the cap C covers the fiber holes 22 that opens to the connection end surface 24 of the ferrule 20 from the front side. Accordingly, even if the cap C as seen from the axial direction X is not formed so as to bulge to the outside of the ferrule 20, it is possible to hold the cap C in a position where the cap C covers the fiber holes 22 of the ferrule 20 from the front side. As such, even if the end surface of the optical fiber 11 that passes through the fiber holes 22 and is exposed to the connection end surface 24 is protected by the cap C, in the phase of passing the optical fiber 11 through the duct, by suppressing the size of the optical connector 1A on the end part of the optical fiber 11 so that the optical connector 1A on the end part of the optical fiber 11 is smaller, it is possible to pass more optical fibers 11 through the duct.

According to the first embodiments, by fitting and inserting the front end part of the guide pins 50 into the fitting holes CH of the cap C, it is possible to sandwich the ferrule 20 between the cap C provided on the front end part of the guide pins 50 and the pin clamp 60 provided on the rear end part of the guide pins 50. Accordingly, even if the housing 30 and the second member 82 are not attached to the ferrule 20, it is possible to prevent the ferrule 20 with respect to the guide pins 50 and the clamp pin 60 from being pulled out to the front side. As such, in a state where the housing 30 and the second member 82 are not attached, it is possible to prevent the ferrule 20 from falling when passing the optical fiber 11 through the duct.

Second Embodiments

Next, an optical connector 1B according to second embodiments of the present invention is described mainly with reference to FIG. 11 to FIG. 14. To avoid redundancy, in the explanation to follow, previously explained components that share the same configurations are labeled with similar reference signs, with explanations omitted.

Figure 11:
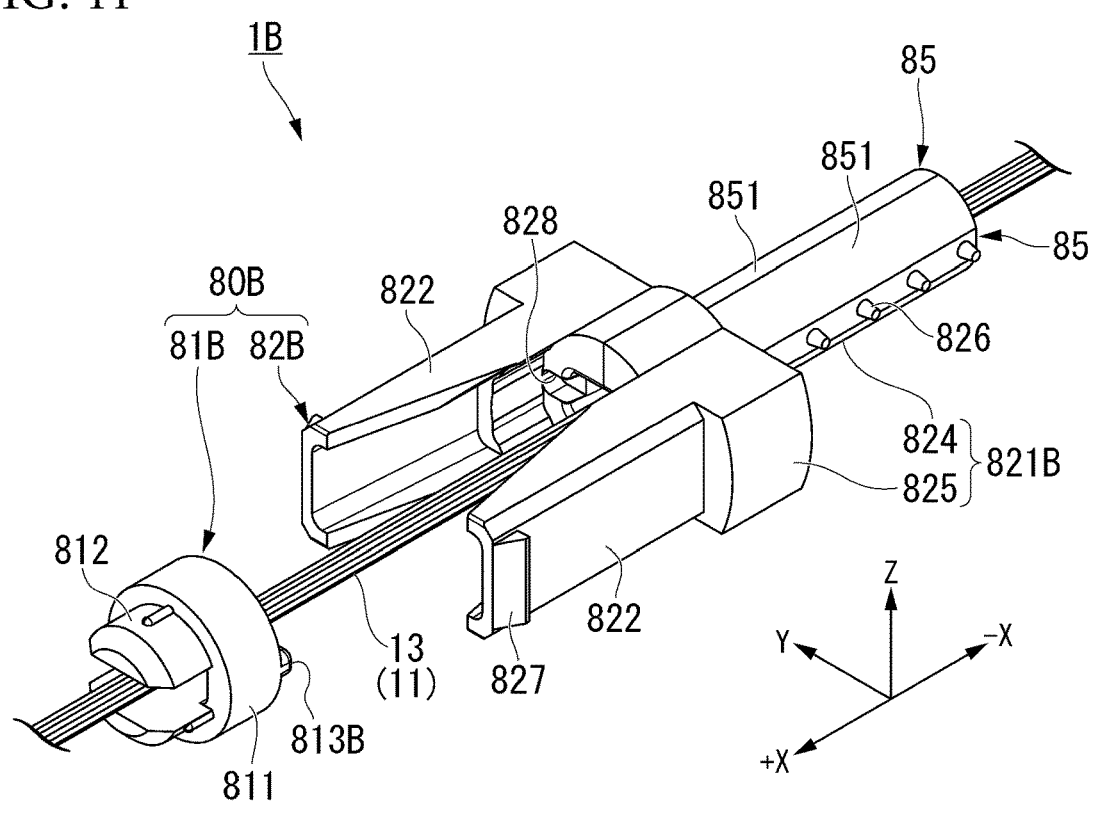
FIG. 11 is a perspective view showing an enlarged view of a first member and a second member which configure an optical connector according to second embodiments.
Figure 12:
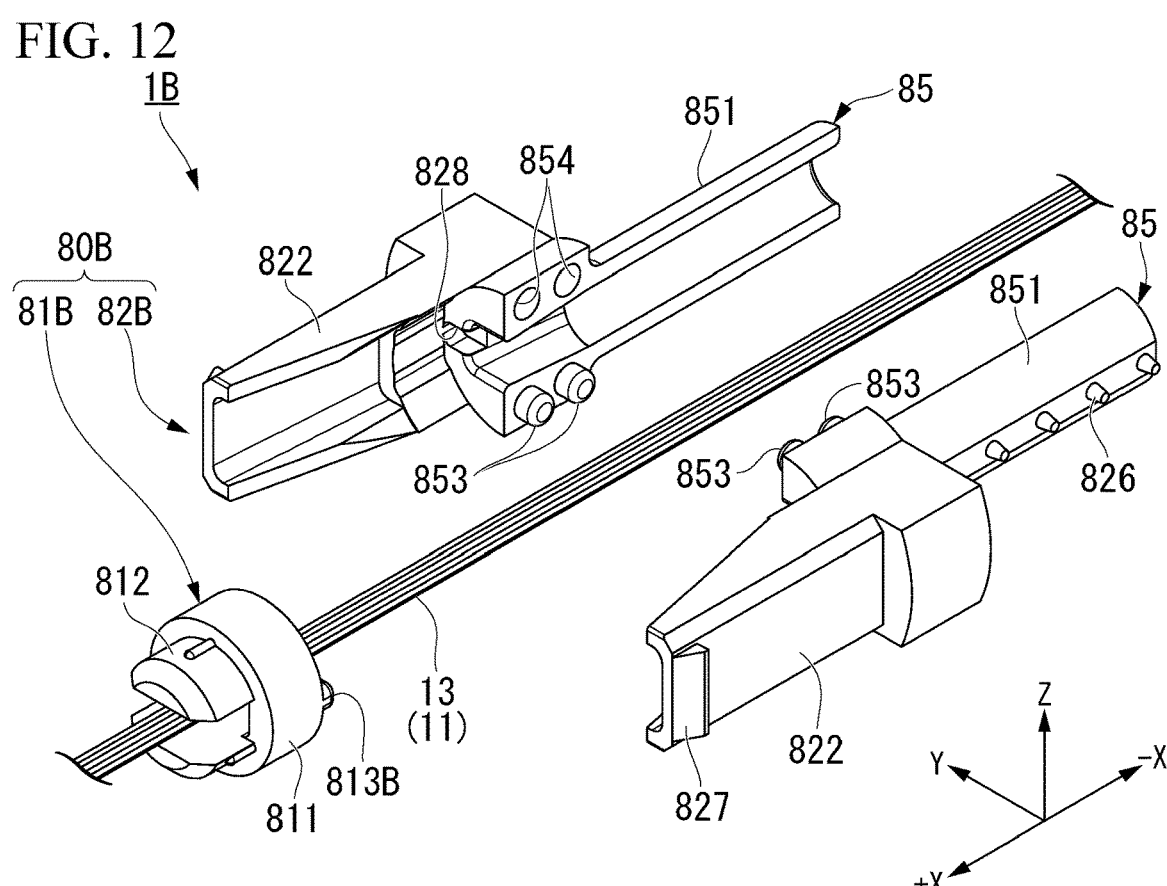
FIG. 12 is a split view of a second member on FIG. 11 divided into two divided fragments.

The optical connector 1B of the second embodiments, as shown in FIG. 11 and FIG. 12, with the exclusion of a spring push 80B, includes similar configurations as the configurations of the first embodiments (the optical cable 10, the ferrule 20, the housing 30, the coupling 40, the cap C, guide pins 50, the pin clamp 60, the spring 70, and the crimp ring 90 (refer to FIG. 1 to FIG. 3 and so on)). In FIG. 11 and FIG. 12, of the components of the optical connector 1B, excluding the optical fiber 11, configurations similar to that of the optical connector 1A of the first embodiments are omitted.

The spring push 80B, similar to the spring push 80 of the first embodiments, includes a first member 81B and a second member 82B.

Figure 14:
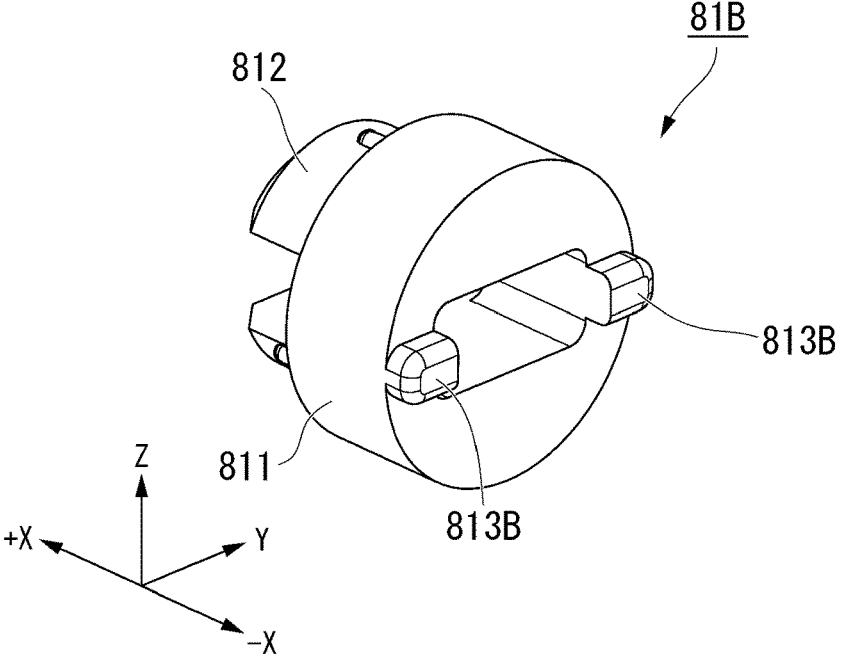
FIG. 14 is a perspective view of a first member on FIG. 11 as seen from the rear side.

The first member 81B includes the main body part 811, the spring holding part 812, and a positioning protrusion 813B. The configuration of the main body part 811 and the spring holding part 812 is similar to the configuration of the main body part 811 and the spring holding part 812 of the first embodiments. The positioning protrusions 813B of the first member 81B as shown in FIG. 14 protrude to the rear side from the main body part 811. Out of the components of the main body part 811, the two positioning protrusions 813B are positioned on both end parts in the left and right direction Y. Furthermore, the two positioning protrusions 813B may be, for example, positioned on both end parts of the up and down direction Z of the main body part 811.

Figure 13:
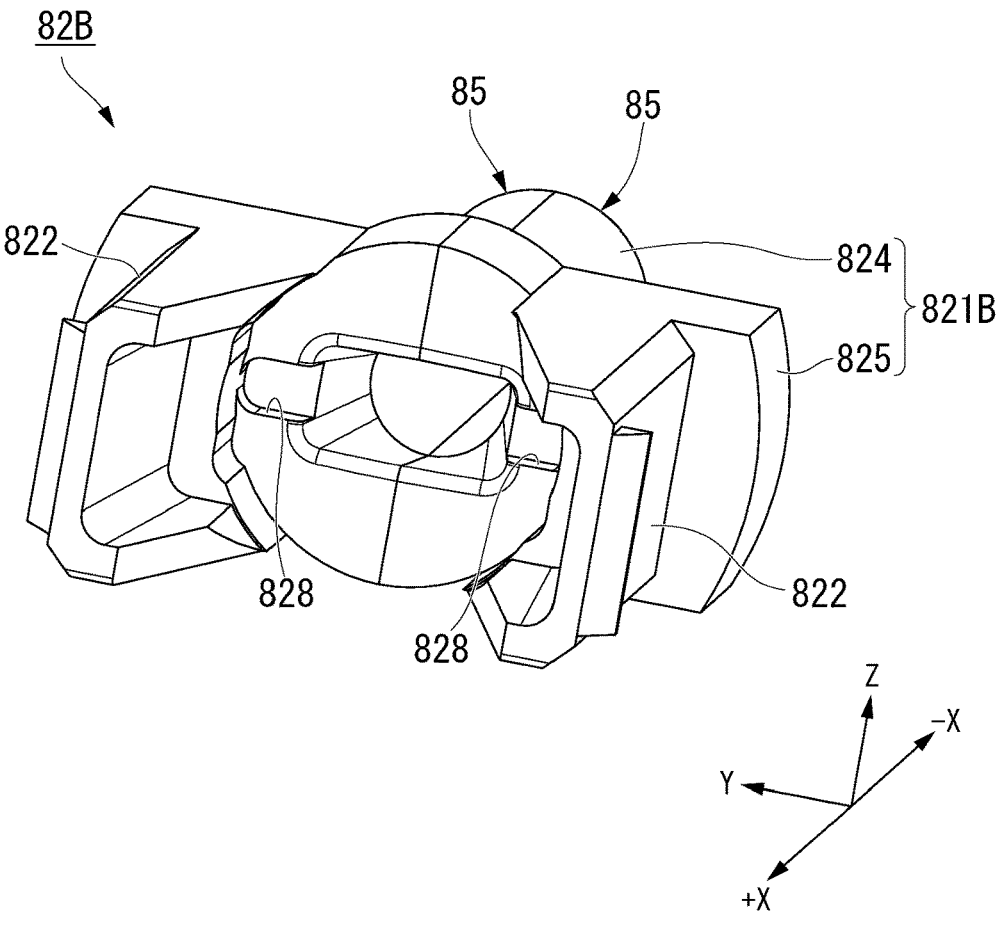
FIG. 13 is a perspective view of a second member on FIG. 11 as seen from the front side.

As shown in FIG. 11 and FIG. 13, a second member 82B includes a cylindrical part 821B and the two engaging pieces 822. The cylindrical part 821B and the engaging pieces 822 are almost similar to the cylindrical part 821B and the engaging pieces 822 of the first embodiments. However, the slit 823 (refer to FIG. 4 and so on) is not formed on the cylindrical part 821B. The cylindrical part 821B, on a surface that faces the first member 81B in the axial direction X (especially the positioning protrusion 813B) is formed with a positioning recess part 828. The number of the positioning recess parts 828 corresponds to the number of the positioning protrusion 813B (two) mentioned above. The two positioning recess parts 828 are aligned having an interval in the left and right direction Y in the cylindrical part 821B. The positioning protrusions 813B of the first member 81B are inserted into each of the positioning recess parts 828. Accordingly, it is possible to suppress or prevent the relative displacement of the position of the first member 81B and the second member 82B in an orthogonal direction to the axial direction X. It is possible to suppress or prevent the positioning displacement of the cylindrical shaped first member 81B and the second member 82B in a circumferential direction.

As shown in FIG. 12 to FIG. 14, the second member 82B of one or more embodiments is configured of two divided structures 85. Each of the divided structures 85 includes a half cylindrical shaped part 851. The half cylindrical shaped part 851 is formed in a cylindrical shape that it extends in the axial direction X. By combining two of the half cylindrical shaped parts 851 of the divided structure 85, the cylindrical part 821B is formed.

On each of the half cylindrical shaped parts 851 of the divided structure 85, two convex parts 853 and two concave parts 854 are formed. By fitting and inserting a side of the convex parts 853 of the two divided structures 85 into the other side of the concave parts 854, the two divided structures 85 are fixed to one another.

The two divided structures 85 are aligned in a direction orthogonal to the axial direction X. In one or more embodiments, the two divided structures 85 align in a direction where two engaging pieces 822 align (in other words, the left and right direction Y) in the second member 82B. For this reason, each of the divided structures 85 includes an engaging piece 822 formed so that it is a single component with the half cylindrical shaped part 851.

The optical connector 1B of the second embodiments may be produced in similar manner as the optical connector 1A of the first embodiments by carrying out a first process, a second process, and a third process and so on. However, in a second process of one or more embodiments, as shown in FIG. 11 and FIG. 12, in a direction orthogonal to the axial direction X (the left and right direction Y on FIG. 11 and FIG. 12), in a state where the extending part 13 of the optical fiber 11 is arranged between the two divided structures 85 of the second member 82B, by combining the two divided structures 85, the extending part 13 is inserted through the inside of the cylindrical part 821B of the second member 82B.

The optical connector 1B of the second embodiments and the method for manufacturing the optical connector 1B have similar effects to the effects of the first embodiments.

According to the optical connector 1B of the second embodiments, the second member 82B (especially the cylindrical part 821B) is configured of the two divided structures 85. For this reason, it is possible to insert the extending part 13 through cylindrical part 821B of the second member 82B in a state where the extending part 13 of the optical fiber 11 is arranged between the two divided structures 85 in a direction orthogonal to the axial direction X by combining the two divided structures 85. In other words, by attaching and removing the two divided structures 85, it is possible to insert and remove the extending part 13 in a direction orthogonal to the axial direction X with respect to the cylindrical part 821B. As such, without passing the ferrule 20, the pin clamp 60, and the spring 70 through the inside of the cylindrical part 821B of the first member 81B, it is possible to assuredly insert the extending part 13 of the optical fiber 11 through the cylindrical part 821B.

In the optical connector 1B of the second embodiments, for example, out of the components of the second member 82B, only the cylindrical part 821B is configured of the two divided structures 85, and only on side of the two engaging pieces 822 of the second member 82B may be included in the divided structure 85. In order to configure the second member 82B in this manner, for example, the cylindrical part 821B (especially the cylindrical main body 824) may be configured of the two half cylindrical shaped parts 851 aligned in the up and down direction Z.

Third Embodiments

Next, an optical connector 1C according to third embodiments of the present invention is described with reference to FIG. 15 and FIG. 16. To avoid redundancy, in the explanation to follow, previously explained components that share the same configurations are labeled with similar reference signs, with explanations omitted.

Figure 15:
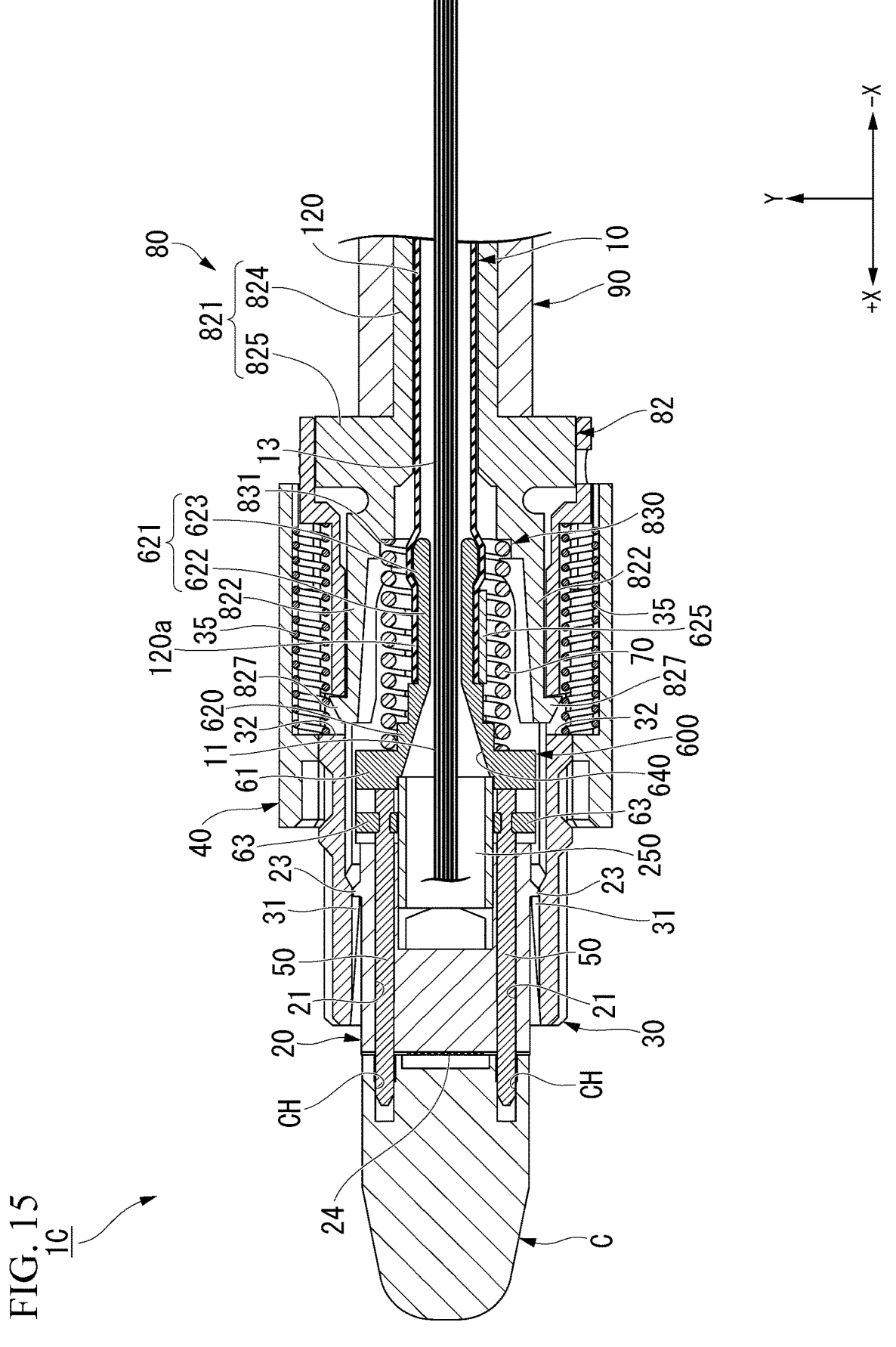
FIG. 15 is a perspective view showing an optical connector according to third embodiments.

In the optical connector 1C of one or more embodiments, as shown in FIG. 15, the shape of a pin clamp 600, the boundary formed by an outer cover (protection member) 120, and the configuration of the spring push 80 mainly differ from the first embodiments.

The pin clamp 600 additionally includes a protruding part 621. The protruding part 621 protrudes to the rear side from a spring holding part 620. The protruding part 621 as shown in FIG. 15 includes a straight part 622 and a bulge part 623.

The straight part 622, is a linear shape that extends to the rear side from the spring holding part 620. The bulge part 623 is provided on the rear side of the straight part 622, and bulges to the outside more than the straight part 622.

On the pin clamp 600, an inserting through hole 640 which penetrates through in the axial direction X is formed. The inserting through hole 640 is formed from the clamp main body 61, the spring holding part 620, and the protruding part 621 that align in the axial direction X. The extending part 13 of the optical fiber 11 extending from the rear side of the ferrule 20 is inserted through the inserting through hole 640.

As shown in FIG. 15, an end 120a of an outer cover 120 is engaged with the straight part 622 of the protruding part 621. Accordingly, the protruding part 621 is covered by the outer cover 120. For the outer cover 120, for example, a braid tube may be used. The braid tube is a tube configured of fiber (typically resin fiber) that is braided in a mesh like shape. By using the braided tube as the outer cover 120, as shown in FIG. 15, the outer cover 120 is capable of deforming according to the shape of the protruding part 621. In other words, in a state where the protruding part 621 is inserted through the inside of the outer cover 120, the bulge part 623 spreads the outer cover 120 from the inside towards the outside of the outer cover 120. Accordingly, it is easy for the bulge part 623 to get caught on the outer cover 120.

A crimp ring 625 is formed to be a cylindrical shape. On the crimp ring 625, an opening 626 which extends over the entire length of the crimp ring 625 in the axial direction X is formed on a part of the circumferential direction of the crimp ring 625. The crimp ring 625 crimps the outer cover 12 of the optical cable 10 and the protruding part 621 arranged within the outer cover 12. Accordingly, the outer cover 120 and the protruding part 621 are fixed.

In one or more embodiments, the spring push 80 does not include the first member. As shown in FIG. 15, a step part 830 is formed within the second member 82. The spring 70 is provided such that the rear end part of the spring 70 contacts a front surface 831 of the step part 830. The size of the front surface 831 is in accordance with the size of the outer diameter of the spring 70. By arranging the second member 82 on the rear side of the spring 70, the spring 70 is biased to the front side.

Boots 250 are formed to extend in the axial direction X in a cylindrical shape and provided within the ferrule 20. An end of the boots 250 is inserted through the inside of the ferrule 20, and the other end of the boots 250 protrudes from the outside of the ferrule 20. The optical fiber 11 is inserted through the inside of the boots 250. The boots 250 is formed by an elastic member. The boots 250 is a member to protect the optical fiber so that stresses are not applied to the optical fiber 11.

Next, an example of a method for manufacturing the optical connector 1C of one or more embodiments is explained. Furthermore, since the method for manufacturing the optical connector 1C is fundamentally similar to the method for manufacturing the first embodiments, only the differences are explained.

Figure 16:
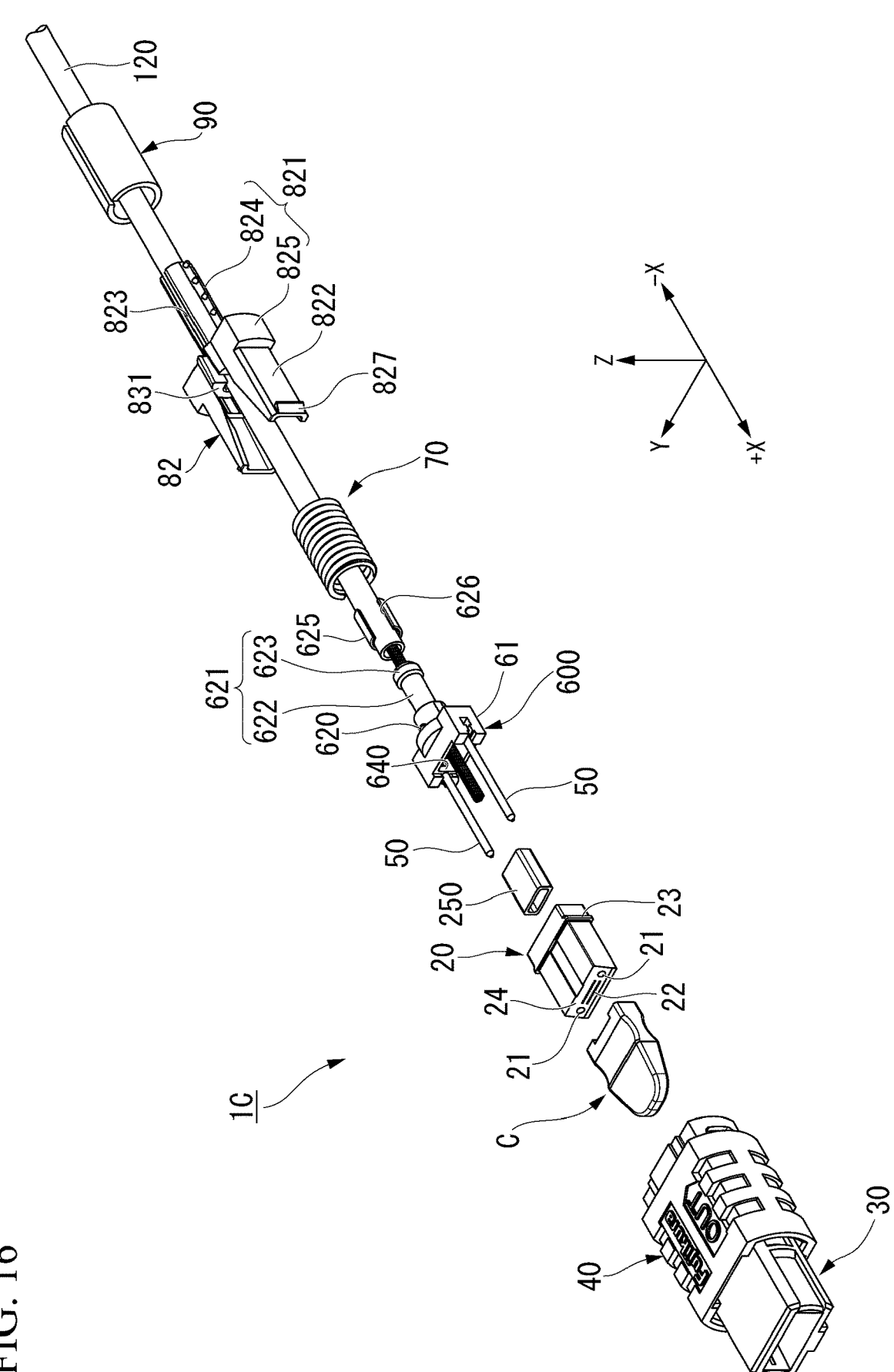
FIG. 16 is an exploded perspective view of an optical connector of FIG. 15.

In a first process, as shown in FIG. 16, starting from the end part of the optical fiber 11, the ferrule 20, the pin clamp 600 holding the two guide pins 50, and the spring 70 are arranged.

In a second process, the spring 70 is configured to contact the front surface 831 of the spring push 80. Moreover, the end 120a of the outer cover 120 covers the protruding part

621. The protruding part 621 in which the opening 626 of the crimp ring 625 is covered by the outer cover 120 is passed through. By crimping using the crimp ring 625, the outer cover 120 and the protruding part 621 are fixed.

In third embodiments, along with accommodating the ferrule 20 from the rear side to the inside of the housing 30, the pin clamp 600 and the spring 70, the spring push 80 is engaged with the housing 30. Accordingly, the spring 70 deforms elastically, and the ferrule 20 is biased to the front side due to the elastic force of the spring 70.

As in the explanation above, in the optical connector 1C of one or more embodiments, has similar effects to the effects of the first embodiments.

The optical fiber 11 is protected by the outer cover 120 (protection member), and the end 120a of the outer cover 120 is engaged with the pin clamp 600. Accordingly, since the spring 70 does not contact the optical fiber 11, even if the spring 70 moves in the longitudinal direction, it is possible to prevent the optical fiber 11 from being scratched by the spring 70. In other words, it is possible to protect the optical fiber 11 when passing the optical fiber 11 through the duct accordingly.

Since the end 120a of the outer cover 120 extends to the straight part 622 of the protruding part 621 of the pin clamp 600, it is possible to further suppress the protruding part 621 from being pulled out to the outside of the outer cover 120. Moreover, since the protruding part 621 includes the bulge part 623, it is possible to assuredly suppress the protruding part 621 from being pulled out to the outside of the outer cover 120.

The method for manufacturing the optical connector 1C of one or more embodiments has similar effects to the effects of the first embodiments.

Compared to the first embodiments, since the first member 81 is not included, it is possible to omit the process of arranging the first member 81. Accordingly, it is possible to shorten the manufacturing time.

Furthermore, although braided tubing is used as the outer cover 120, the material of the outer cover 120 is not limited thereto, and other materials may be used. Braided tubing may also be used for the outer cover 12 in the first embodiments and the second embodiments as well.

Although the shape of the pin clamp 600 is configured so that it is different from the shape in the first embodiments, it may be the same as the shape of the first embodiments. In the case of such configuration, the end 120a of the outer cover 120 may extend to the spring holding part 620 which is the rear end of the pin clamp 600.

Although the end 120a of the outer cover 120 is configured so that the end 120a of the outer cover 120 is engaged with the straight part 622 of the protruding part 621 of the pin clamp 600, the end 120a of the outer cover 120 may be configured to extend to the bulge part 623. In the case of such a configuration, it is possible to shorten the length dimension in the longitudinal direction of the outer cover 120 and omit the crimp ring 625.

Although the outer cover 120 and the protruding part 621 are fixed by the crimp ring 625, it is not necessary to include the crimp ring 625. It is possible to fix the outer cover 120 and the protruding part 621 by covering the protruding part 621 using the outer cover 120 which is elastic and includes an inner diameter that is smaller than the outer diameter of the straight part 622.

In the optical connector of the first embodiments to the third embodiments of the present invention, the spring holding part 812 of the first member 81 and 81B, for example, may configured so that the rear end part of the spring 70 is inserted and fitted to the inside of the spring holding part 812.

The optical connector of the first and the second embodiments of the present invention, for example, may not include the pin clamp 60. In this case, the guide pins 50 may be for example fixed to the ferrule 20. The ferrule 20 may support or hold the front end part of the spring 70.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST

L1: Largest Dimension of the First member
L2: Largest Dimension of the Ferrule
1A, 1B, 1C: Optical Connector
11: Optical Fiber
13: Extending part
20: Ferrule
22: Fiber Holes
24: Connection End Surface
30: Housing
50: Guide Pin
60, 600: Pin Clamp
70: Spring
80, 80B: Spring Push
81, 81B: First member
813: Positioning Protrusion
82, 82B: Second member
821, 821B: Cylindrical Part
823: Slit
85: Divided Structure
C: Cap
CH: Fitting Hole
X: Axial Direction (Longitudinal Direction of the Fiber Hole)

What is claimed is:

1. An optical connector comprising:
a ferrule that comprises:
a connection end surface; and
a fiber hole into which an optical fiber is configured to be inserted up to the connection end surface;
a spring that is disposed on a rear side of the ferrule that is opposite to a front side that is a side on which the connection end surface is disposed in a longitudinal direction of the fiber hole;
a spring push that sandwiches the spring with the ferrule and through which the optical fiber is inserted in the longitudinal direction; and
a housing that accommodates the ferrule and the spring and that is engaged with the spring push such that the ferrule is biased to the front side by the spring, wherein
the spring push comprises:
a first member comprising a spring holding part that is inserted into and fitted inside a rear end of the spring and that holds the rear end of the spring; and
a second member that:
accommodates the first member within,
supports the first member, and
is engaged with the housing,
the first member is configured to move with respect to the second member, and the optical fiber is configured to be inserted into and removed from the second member.

2. The optical connector according to claim 1, further comprising:
a pin clamp that is disposed between the ferrule and the spring and that holds a front end part of the spring, wherein
the optical fiber is protected by a cover, and
one end of the cover is engaged with the pin clamp.

3. The optical connector according to claim 1, wherein the optical fiber is configured to be inserted into and removed from the second member from a direction orthogonal to the longitudinal direction.

4. An optical connector comprising:
a ferrule that comprises:
a connection end surface; and
a fiber hole into which an optical fiber is configured to be inserted up to the connection end surface;
a spring that is disposed on a rear side of the ferrule that is opposite to a front side that is a side on which the connection end surface is disposed in a longitudinal direction of the fiber hole;
a spring push that sandwiches the spring with the ferrule and through which the optical fiber is inserted in the longitudinal direction; and
a housing that accommodates the ferrule and the spring and that is engaged with the spring push such that the ferrule is biased to the front side by the spring, wherein
the spring push comprises:
a first member comprising a spring holding part that holds a rear end of the spring; and
a second member that:
accommodates the first member within,
supports the first member, and
is engaged with the housing,
the first member is configured to move with respect to the second member,
the optical fiber is configured to be inserted into and removed from the second member from a direction orthogonal to the longitudinal direction,
the second member comprises a cylindrical part through which the optical fiber is inserted,
a slit that extends over an entire length of the cylindrical part in the longitudinal direction is disposed on a part of the cylindrical part in a circumferential direction of the cylindrical part, and
the first member comprises a positioning protrusion inserted into the slit.

5. The optical connector according to claim 3, wherein the second member is constituted by two divided structures that are aligned in a direction orthogonal to the longitudinal direction.

6. The optical connector according to claim 1, wherein, in a direction orthogonal to the longitudinal direction, a maximum dimension of the first member is equal to or less than a maximum dimension of the ferrule.

7. The optical connector according to claim 1, further comprising:
a cap that covers the fiber hole in the front side; and
a guide pin that penetrates the ferrule in the longitudinal direction, wherein
the cap has a fitting hole into which a front end part of the guide pin projecting to the front side from the connection end surface is fitted.

8. A method for manufacturing the optical connector according to claim 1, the method comprising:

disposing in order the ferrule and the spring from an end part of the optical fiber;

inserting the optical fiber through the spring push after the disposing; and accommodating the ferrule and the spring within the housing and engaging the spring push with the housing such that the ferrule is biased to the front side after the inserting.

* * * * *